Patented July 2, 1929.

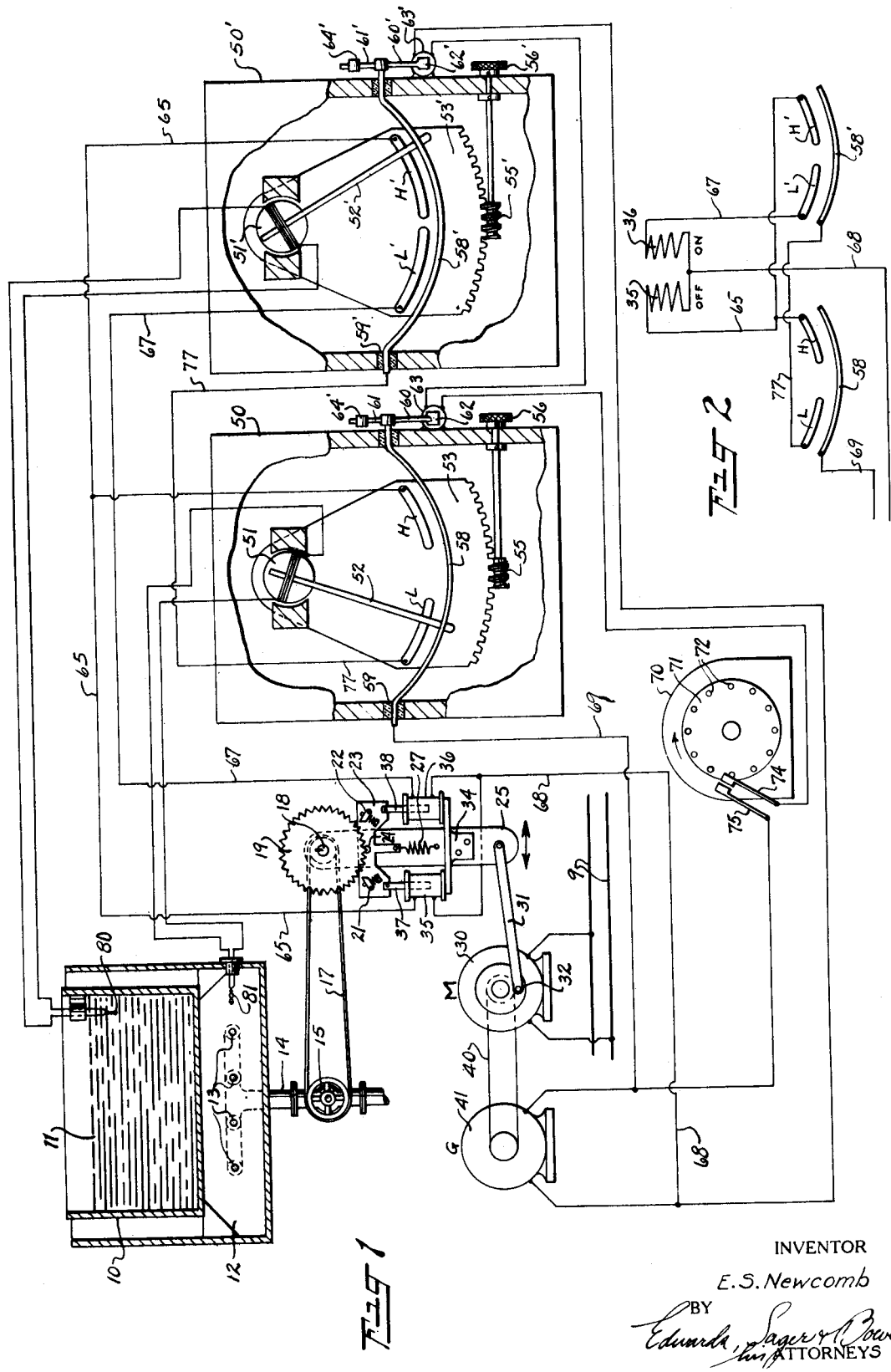

1,719,441

UNITED STATES PATENT OFFICE.

EVERETT S. NEWCOMB, OF CLEVELAND, OHIO, ASSIGNOR TO CHARLES ENGELHARD, INC., A CORPORATION OF NEW JERSEY.

TEMPERATURE-REGULATING SYSTEM.

Application filed May 23, 1924. Serial No. 715,400.

This invention relates to heating or cooling devices and particularly to an improved method and means for maintaining the temperature of material which is being heated or cooled, within desired limits.

While my invention is applicable to a wide variety of uses many of its advantages may be illustrated in connection with the heating of a treating bath, as for example, a saltpeter treating bath employed in drawing wire. In such an apparatus the wire is fed through the bath and suitable heating means such as gas burners located in a combustion chamber beneath the bath, are employed to maintain the bath at the required high temperature. The bath is continually losing heat by radiation and by the passage through the bath of the wire, and heat is continually supplied to the bath by the burners to take the place of the heat lost. For the purpose of regulating the rate at which the heat is generated by the burners it has been customary to control the burners by a heat responsive device located in the bath. When the temperature of the bath falls too low the heat responsive device acts to increase the flow of gas to the burners and, on the other hand, when the temperature of the bath exceeds the desired maximum the heat responsive device acts to decrease the supply of gas to the burners. It has been found that the use of a regulating device of this character is unsatisfactory for the reason that such device fails to maintain the temperature of the bath within the limits often necessary to proper operation. This is due to the fact that the temperature of the bath does not respond with sufficient quickness to changes in the adjustment of the burners. When the temperature of the bath falls below the minimum desired, as might occur when wire is being fed through the bath at an excessive rate and the regulating means in consequence has acted to increase the supply of gas to the burners, the temperature of the bath does not start to rise immediately but often continues to drop to a point considerably below the desired minimum. A considerable quantity of the increased heat generated at the burners is not immediately communicated to the bath but instead is absorbed by the walls of the combustion chamber and neighboring parts. The result is that, although the burners are generating more heat the bath continues for a time to lose heat at a greater rate than it receives heat and the temperature of the bath continues to drop. A similar condition is apt to exist when an attempt is made to reduce the temperature of the bath when it has become too hot. Although the burners are cut down when the temperature of the bath has reached the desired maximum, the bath continues to absorb heat by radiation from the highly heated walls of the combustion chamber and the temperature of the bath continues to rise above the desired maximum. If an attempt is made to adjust the heat responsive device to maintain a substantially constant temperature of the bath, that is, if the device is adjusted so that the temperature at which it increases the supply of gas is very close to the temperature at which it decreases the supply of gas, a condition is apt to result in which the temperature of the bath continuously oscillates between too high a maximum and too low a minimum.

One of the important objects of my invention is to avoid the objectionable action above described and to provide a regulating system through which the temperature of the bath may be maintained substantially constant and to accomplish this I provide means for decreasing the supply of fuel to the burners when either the temperature of the bath or the temperature of the combustion chamber exceeds predetermined values and to increase the supply of fuel to the burners when both the temperature of the bath and the combustion chamber fall below predetermined values. In the normal operation of the apparatus the temperature of the combustion chamber will be much higher than the temperature of the bath and the temperature of the combustion chamber will vary over a much wider range than the temperature of the bath. In carrying out my improved method I permit the temperature of the combustion chamber to vary over a considerable range without effecting an adjustment of the burners. The range over which the bath temperature may vary without effecting an adjustment of the burners is however much more limited than the permissible range in temperature of the combustion chamber.

My invention is applicable to apparatus other than treating baths and may be applied to control of the temperature of heated bodies, material or compartments, generally, and by a slight modification of the apparatus hereinafter described it is applicable to the control of refrigerating systems wherein it is desired to maintain the temperature of a cooled compartment substantially constant. When applied to a refrigerating system wherein a compartment is cooled by a suitable refrigerating medium such as brine means will be provided for decreasing the rate of withdrawal of heat from the compartment in case the temperature of the compartment is less than a desired minimum or in case the temperature of the brine is less than a desired minimum and for increasing the refrigerating action in case both the temperature of the compartment is above a desired maximum and the temperature of the brine is above a desired maximum.

Other advantages and objects of my invention will appear from the following description taken in connection with the accompanying drawing wherein Fig. 1 represents diagrammatically a heating system embodying one form of my invention and Fig. 2 represents a portion of the controlling circuits shown in Fig. 1.

Referring to Fig. 1, 10 represents a receptacle or compartment adapted to contain material 11 which it is desired to maintain at a constant high temperature. The material 11 may constitute a treating bath. 12 is a combustion chamber provided with burners 13 supplied from a pipe 14 having a valve 15 for regulating the supply of fuel to the burners. The valve 15 is operated by means of a belt 17 from a shaft 18. Secured to the shaft 18 is a gear wheel 19 adapted to be actuated by spring press pawls 21 and 22 which are carried by a yoke member 23 pivoted at 24 to a swinging arm 25 pivotally mounted upon the shaft 18. The yoke 23 is normally held in central position in which neither of the pawls 21 and 22 engage with the gear wheel 19 by means of a spring 27 secured at one end to the yoke 23 at a point below its pivot 24 and at its other end to the swinging member 25. The swinging member 25 is adapted to be swung or oscillated about its pivotal support by means of an electric motor 30 to which it is connected by a link 31 operated from a crank 32 on the motor shaft. Motor 30 is operated by current supplied from power means 9. Mounted upon a support 34 secured to the swinging member 25 are two solenoids 35 and 36. Solenoid 35 is connected to the yoke 23 by means of a rod 37 and solenoid 36 is connected to the yoke by means of a rod 38. When either one or the other of the solenoids are energized their respective rods are moved downwardly and tip the yoke in one direction or the other, about its pivoted support on the swinging member 25 in such a manner that one of the pawls engages the teeth of the gear wheel 19. In operation the member 25 is continuously oscillated about its pivotal support by means of the motor 30. If neither of the solenoids is energized neither of the pawls 21 and 22 engage with the teeth of the gear wheel 19 and the gear wheel remains stationary. If the solenoid 35 is energized the yoke is tilted and the pawl 22 engages the gear wheel and as the member 25 is oscillated this pawl serves to rotate the gear 19 in a clockwise direction and through shaft 18, belt 17 operates valve 15 to cut down the supply of fuel to the burners 13. When the solenoid 36 is energized a reverse action takes place and the valve 15 is operated to increase the supply of fuel to the burners 13.

Operated from the motor 30 by means of a belt 40 is a generator 41 which supplies current at a suitable low voltage to the solenoids 35 and 36 through contacts of two contact making voltmeters 50 and 50'. Each of these voltmeters are similarly constructed and comprise pivoted armatures 51, 51' carrying needles 52 and 52'. Positioned beneath the needles 52, 52' and pivotally mounted about the axes of the armatures are segments 53, 53' formed of insulating material. These segments may be moved about their pivotal supports and so adjusted to different positions by means of worms 55, 55' operated by knobs 56, 56'. Secured to each of the segments are two arcuate contacts L, H, L', H'. Contacts H and H' are both connected through conductors 65, to one terminal of the solenoid 35. Contact L' is connected by a conductor 67 to one terminal of the solenoid 36 and the remaining terminals of the solenoids 35, 36 are connected to the left hand terminal of the generator 41 through conductor 68. Mounted above the needles 52, 52' are insulated arcuate bars 58, 58' pivoted in insulated bearings 59, 59' in the voltmeter frames. Bars 58, 58' are formed at one end with oppositely extending arms 60, 60', 61, 61'. Arms 60, 60' are provided with armatures 62, 62' adapted to be attracted by electromagnets 63, 63' so as to turn the arcuate bars in their bearings. When so turned the bars 58, 58' engage the needles and force them downwardly toward the segments 53, 53'. When either of the needles is over an arcuate contact the movement of the pivoted bar above the needle forces the needle into engagement with this contact and completes a circuit from the contact to the arcuate bar through the needle. As actually constructed arcuate bars 58, 58' will be positioned directly above the arcuate contacts. Bars 58, 58' are normally biased to their raised or contact breaking position by means of counterweights 64, 64' carried respectively by the extension 61, 61'. The arcuate bar 58 is connected by conductor 69 to the right hand terminal of the generator 41 while the arcuate bar 58' is connected through conductor 77 to the arcuate contact L.

Included in a separate circuit from the generator 41 are the electromagnets 63, 63' and in series therewith a periodic current interrupting device 70. This interrupting device may be of any approved construction and as shown comprises a disk 71 adapted to be rotated in a clockwise direction by a clock or other motor not shown. Disk 71 carries a circular series of pins 72 adapted to engage successively a spring pressed contact 74 to move the same into engagement with a contact 75. When a pin has passed out of engagement with the contact 74 this contact springs away from engagement with contact 75 and in this manner the circuit through the electromagnets 63, 63' is periodically made and broken.

For the purpose of controlling the positions of the needles 52, 52' I provide two thermo couples 80 and 81. The thermo couple 81 is located in the combustion chamber 12 and is connected in series with the armature 51 of the instrument 50. The thermo couple 80 is located in the bath 11 and is connected in series with the armature 51' of the instrument 50'. As the temperatures of the bath or combustion chamber change the voltage of the thermo couples 80 or 81 change, the current through the armatures 51 or 51' is varied and the needles 52 or 52' are moved over the segments 53 or 53'. In operation when the bath is at too high a temperature the needle 52' will be positioned above the contact H' and when the bath is at too low a temperature the needle 52' will be positioned above the contact L'. Similarly when the combustion chamber is at too high a temperature the needle 52 will be positioned above the contact H and when the combustion chamber is at too low a temperature the needle 52 will be positioned above the contact L.

Let it be assumed that the needle 52 is positioned above the contact L and the needle 52' is positioned above the contact L'. This will mean that both bath and combustion chamber are at too low a temperature. When the circuit through the electromagnets 63, 63' is completed by the interrupter 70, the bars 58, 58' will be rotated to force the needle 52 into engagement with contact L and needle 52' into engagement with contact L'. A circuit will then be completed from the right hand terminal of the generator 41 through conductor 69 to the bar 58 thence through needle 52, arcuate contact L, conductor 77, bar 58', needle 52', arcuate contact L', conductor 67, solenoid 36 conductor 68 to the left hand terminal of the generator 41. The solenoid 36 will be energized and will tilt the yoke 23 in a clockwise direction bringing the pawl 21 into engagement with the teeth of the gear 19 and through the oscillation of the member 25 the pawl 21 will cause gear 19 to rotate and operate the valve 15 to increase the supply of fuel to the burners 13.

If the needle 52 lies over the contact H and needle 52' lies over contact L' upon energizing of the magnets 63, 63' a circuit will be closed through the solenoid 35 by the way of bar 58, contact H, conductor 65, solenoid 35. This will result in a tilting of the yoke 23 in a counter-clockwise direction and the operation of the valve 35 to decrease the supply of fuel to the burners.

When needle 52 lies over contact L and needle 52' lies over contact H' the circuit will be completed through the bar 58, contact L, conductor 77, bar 58', contact H, conductor 65 and solenoid 35 and valve 15 will be operated to decrease the supply of fuel. When needle 52 lies above contact H and needle 52' lies above contact H' a circuit which can be readily traced on Fig. 2, will be completed from bar 58 through contact H and solenoid 35. Yoke 23 will be tilted in a counter-clockwise direction and valve 15 operated to decrease the supply of fuel.

The contacts H and L are normally positioned farther apart from the contacts H' and L'. The distance apart of the contacts H and L represents the range over which the temperature in the combustion chamber may vary without effecting an adjustment of the burners. It is obvious that other means may be employed to provide for a greater permissible range in the temperature of the combustion chamber. Thus the thermo couple in the bath may be of such a character that it is more susceptible to temperature changes than the thermo-couple in the combustion chamber.

To prevent sparking at the voltmeter contacts when the needles move out of engagement with the arcuate contacts, the circuit through these contacts may be connected to the interrupter 70 and controlled by the interrupter in such a way that current will be established through the needles and contacts, at the interrupter after the needles have been lowered and this current will be broken at the interrupter before the needles have been raised.

I claim:

1. The combination with a treating bath, a heating chamber and a burner therein, of means for decreasing the supply of fuel to said burner when the temperature of said bath exceeds a predetermined value or when the temperature of said chamber exceeds a predetermined value and for increasing the supply of fuel when both the temperature of the bath falls below a predetermined value and the temperature of the heating chamber falls below a predetermined value.

2. The combination of a bath, a heating chamber and a burner therein, a heat responsive device in said bath, a heat responsive device in said chamber and means operated by said heat responsive devices for decreasing the supply of fuel to said burner when the temperature of said bath exceeds a predetermined value or when the temperature of said chamber exceeds a predetermined value and for increasing the supply of fuel to the burner when both the temperature of the bath and the temperature of the chamber fall below predetermined values.

3. The combination of a bath, a heating chamber and a burner therein, a thermo couple in said bath, a thermo couple in said chamber and means operated by said thermo couples for decreasing the supply of fuel to said burner when the temperature of said bath exceeds a predetermined value or when the temperature of said chamber exceeds a predetermined value and for increasing the supply of fuel to the burner when both the temperature of the bath and the temperature of the chamber fall below predetermined values.

4. The combination of a bath, a heating chamber, a burner therein, a thermo couple in said bath, a thermo couple in said chamber, an instrument in the circuit of each of said thermo couples and means controlled by said instruments for decreasing the supply of fuel to said burner when the temperature of said bath exceeds a predetermined value or when the temperature of said chamber exceeds a predetermined value and for increasing the supply of fuel to the burner when both the temperature of the bath falls below a predetermined value and the temperature of the chamber falls below a predetermined value.

5. The combination with a receptacle adapted to contain material to be heated, a heating chamber and heater therein, controlling means for varying the rate at which heat is supplied by said heater, two contact making electrical instruments, each provided with a movable element, a high temperature contact and a low temperature contact, means connected with one of said instruments to cause its movable element to engage the high temperature contact of said instrument when the temperature of the material in said receptacle exceeds a predetermined value and to cause said element to engage the low temperature contact of said instrument when the temperature of the material in said receptacle is below a predetermined value, means connected with the other instrument for causing the movable element thereof to engage the high temperature contact of said other instrument when the temperature of the heating chamber exceeds a predetermined value and to cause said element to engage the low temperature contact of said other instrument when the temperature of the heating chamber is below a predetermined value, a source of current and connections between said source, contacts and controlling means whereby the rate at which heat is supplied by said heater is decreased when either of the high temperature contacts are engaged and for increasing the rate at which heat is supplied by said heater when both of said low temperature contacts are engaged.

6. The combination with a treating bath, a heating chamber and a fuel burner therein, electrical controlling means for increasing the supply of fuel to said burner, electrical controlling means for decreasing the supply of fuel to said burner, two contact making electrical instruments each provided with a movable element, a high temperature contact and a low temperature contact, means connected with one of said instruments to cause its movable element to occupy a position preparatory to closing a circuit through the high temperature contact of said instrument when the temperature of the bath exceeds a predetermined value and to cause said element to occupy a position preparatory to closing a circuit through the low temperature contact of said instrument when the temperature of the bath is below a predetermined value, means connected with the other instrument for causing the movable element thereof to occupy a position preparatory to closing a circuit through the high temperature contact of said other instrument when the temperature of the heating chamber exceeds a predetermined value and to cause said element to occupy a position to close a circuit through the low temperature contact of said other instrument when the temperature of the heating chamber is below a predetermined value, a source of current, connections between said source, contacts and controlling means whereby the controlling means for decreasing the supply to said burner is actuated when the circuit is closed through either of the high temperature contacts and the controlling means for increasing the supply to said burners is actuated when the circuit is closed through the low temperature contact of both instruments and means for closing said contacts.

7. The combination with a treating bath, a heating chamber and a fuel burner therein, electrical controlling means for increasing the supply of fuel to said burner, electrical controlling means for decreasing the supply of fuel to said burner, two contact making electrical instruments each provided with a movable element, and adjustable spaced high and low temperature contacts, means connected with one of said instruments to cause its movable element to occupy a position preparatory to closing a circuit through said high temperature contact of said instrument when the temperature of the bath exceeds a predetermined value and to cause said element to occupy a position preparatory to closing a circuit through the low temperature contact of said instrument when the temperature of the bath is below a predetermined value, means connected with the other instrument for causing the movable element thereof to occupy a position preparatory to closing a circuit through the high temperature contact of said other instrument when the temperature of the heating chamber exceeds a predetermined value and to cause said element to occupy a position preparator to closing a circuit through the low temperature contact of said other instrument when the temperature of the heating chamber is below a predetermined value, a source of current, connections between said source, contacts and controlling means whereby the controlling means for decreasing the supply to said burner is actuated when the circuit is closed through either of the high temperature contacts and the controlling means for increasing the supply to said burners is actuated when the circuit is closed through the low temperature contacts of both instruments and means for closing said contacts.

8. The combination with a receptacle containing material to be heated, a heater, means for gradually decreasing the rate at which heat is generated by said heater while the temperature in said receptacle exceeds a predetermined value or while the temperature in the vicinity of said heater exceeds a predetermined value, and for increasing the rate at which heat is generated by said heater while both the temperature in said receptacle is below a predetermined value and the temperature in the vicinity of said heater is below a predetermined value.

9. The combination of a receptacle adapted to contain material to be heated, a heating chamber and a heater therein, a heat responsive device in said receptacle, a heat responsive device in said chamber, and means operated by said heat responsive devices for gradually decreasing the rate at which heat is generated by said heater while the temperature in said receptacle exceeds a predetermined value or while the temperature in said chamber exceeds a predetermined value, and for gradually increasing the rate at which heat is generated by said heater when both the temperature in said receptacle and the temperature in said chamber fall below predetermined values.

10. The combination of a receptacle adapted to contain material to be heated, a heating chamber, a heater therein, a thermo-couple in said receptacle, a thermo-couple in said chamber, an instrument in the circuit of each of said thermo-couples, and means controlled by said instruments for gradually decreasing the rate at which heat is generated by said heater while the temperature in said receptacle exceeds a predetermined value or while the temperature in said chamber exceeds a predetermined value, and for increasing the rate at which heat is generated by said heater when both the temperature in said receptacle falls below a predetermined value and the temperature in said chamber falls below a predetermined value.

11. Apparatus for maintaining the temperature in a receptacle substantially constant and different from atmospheric temperature, said receptacle being provided with heating means external thereto for causing a transfer of heat through the walls of said receptacle, comprising means for adjusting said heating means to lessen the rate at which heat flows through the walls of said receptacle when the temperature in said receptacle passes in one direction beyond a predetermined range, means adjusting said heating means to lessen still further the rate at which heat flows through said walls when the temperature in said receptacle remains beyond said predetermined range, means adjusting said heating means to lessen the rate at which heat flows through said walls when the temperature in the vicinity of said means passes in the same direction beyond a predetermined range, and means adjusting said heating means to cause heat to flow through said walls at an increased rate when both the temperature in said receptacle and the temperature in the vicinity of said means pass in the opposite direction beyond their respective ranges.

EVERETT S. NEWCOMB.